(12) United States Patent
Wakazono et al.

(10) Patent No.: US 9,417,159 B2
(45) Date of Patent: Aug. 16, 2016

(54) TIRE TESTING MACHINE

(71) Applicant: Kobe Steel, Ltd., Kobe-shi (JP)

(72) Inventors: Takehiko Wakazono, Takasago (JP); Yasuhiro Matsushita, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 163 days.

(21) Appl. No.: 14/277,442

(22) Filed: May 14, 2014

(65) Prior Publication Data

US 2015/0007644 A1 Jan. 8, 2015

(30) Foreign Application Priority Data

Jul. 2, 2013 (JP) ................................. 2013-138578

(51) Int. Cl.
*G01M 17/02* (2006.01)
(52) U.S. Cl.
CPC ............ *G01M 17/02* (2013.01); *G01M 17/024* (2013.01)
(58) Field of Classification Search
None
See application file for complete search history.

(56) References Cited

U.S. PATENT DOCUMENTS

| | | | | |
|---|---|---|---|---|
| 3,631,716 A * | 1/1972 | Monajjem | .......... | B29D 30/0633 73/146 |
| 4,359,897 A * | 11/1982 | Ugo | ........................ | B05C 1/027 118/243 |
| 4,670,289 A * | 6/1987 | Miller, III | ........... | G01M 17/024 118/320 |
| 2009/0272183 A1* | 11/2009 | Sukegawa | .......... | G01B 11/2522 73/146 |
| 2013/0233066 A1* | 9/2013 | Wakazono | .......... | G01M 17/021 73/146 |
| 2013/0233067 A1* | 9/2013 | Wollbrinck | ......... | G01M 17/021 73/146 |
| 2015/0000391 A1* | 1/2015 | Wakazono | .......... | G01M 17/024 73/146 |

FOREIGN PATENT DOCUMENTS

| | | |
|---|---|---|
| JP | 2000-329658 | 11/2000 |
| JP | 2006-95738 | 4/2006 |

* cited by examiner

*Primary Examiner* — Andre Allen
(74) *Attorney, Agent, or Firm* — Oblon, McClelland, Maier & Neustadt, L.L.P.

(57) ABSTRACT

A tire testing machine of the present invention performs tests on a tire in a testing station, and prints a mark based on the test result in a predetermined mark position of the tire after undergoing the tests by means of a marking device. A controller of the tire testing machine previously stores therein the contents of the tests for performing the tests, and causes the testing machine to perform the tests according to a recipe. In order to freely set the marking setting conditions for marking in the marking device, the controller of the marking device previously stores therein a first marking setting condition as the recipe, and also stores therein a second marking setting condition different from the recipe by an input device as a script. Marking is performed according to the contents of the marking setting condition described in either the recipe or script selected.

1 Claim, 6 Drawing Sheets

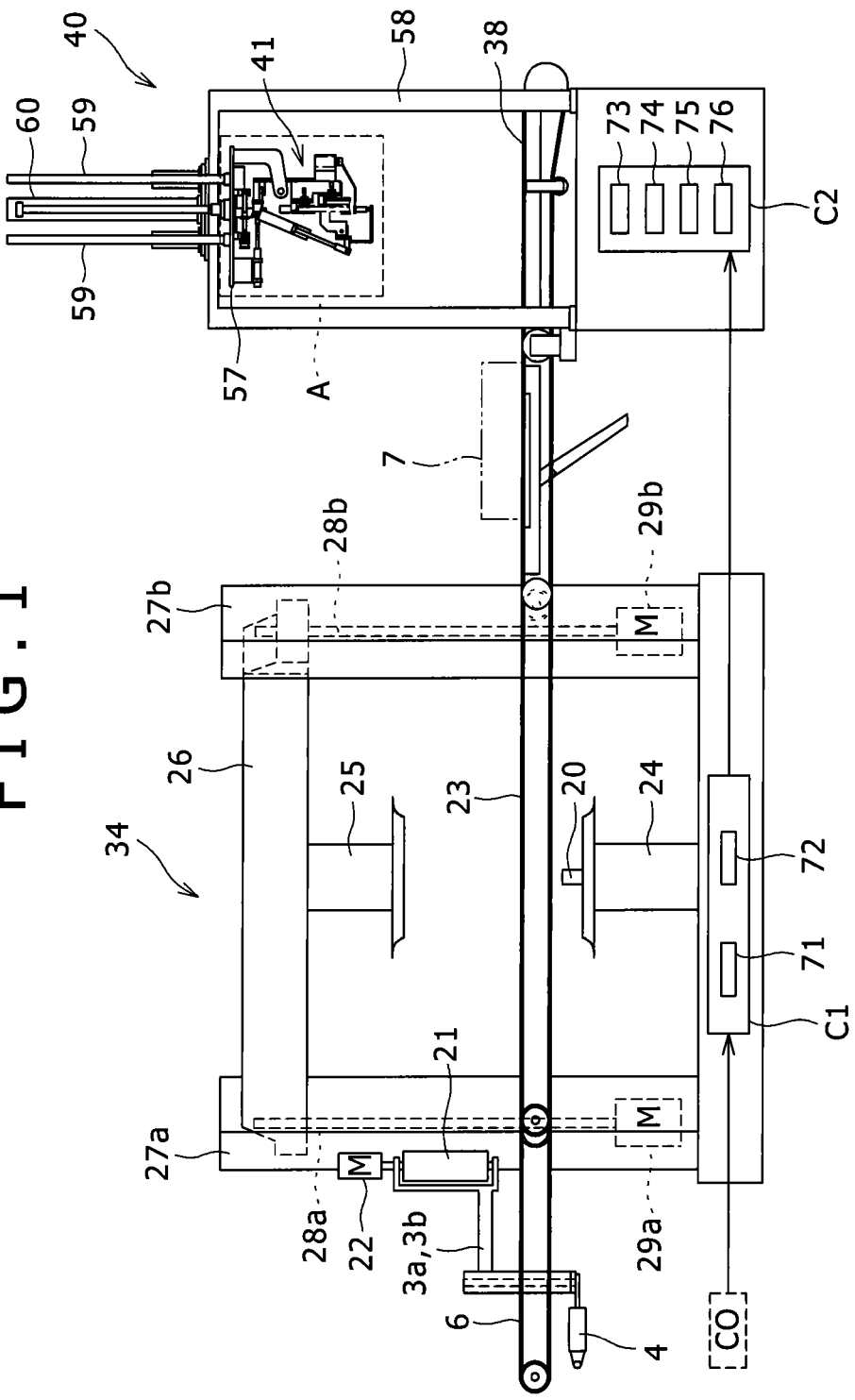
F I G. 1

FIG.4A

RECIPE SCREEN

MARKING POSITION

| REV1HP ▽ |   | UPPER ▽ |

SHAPE OF MARK        COLOR OF MARK

| O ▽ |   | RED ▽ |

| INPUT PARAMETER |   | SCRIPT |

FIG.4B

SCRIPT SELECTION SCREEN

|   | SCRIPT FILE |   |
|---|---|---|
|   | Sc1.mrk | ▽ |
| ✓ | Sc2.mrk |   |
|   | Sc3.mrk | △ |

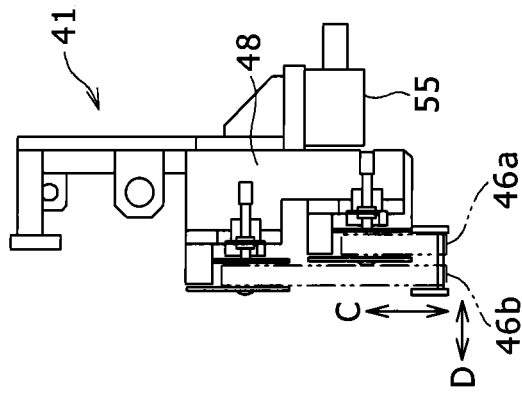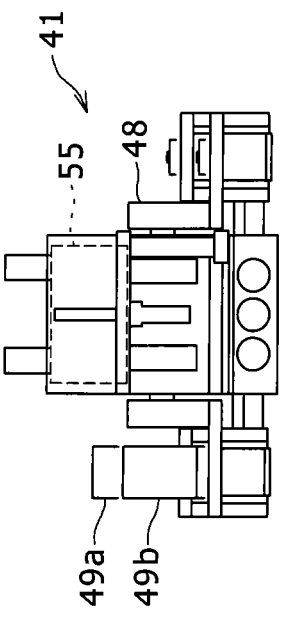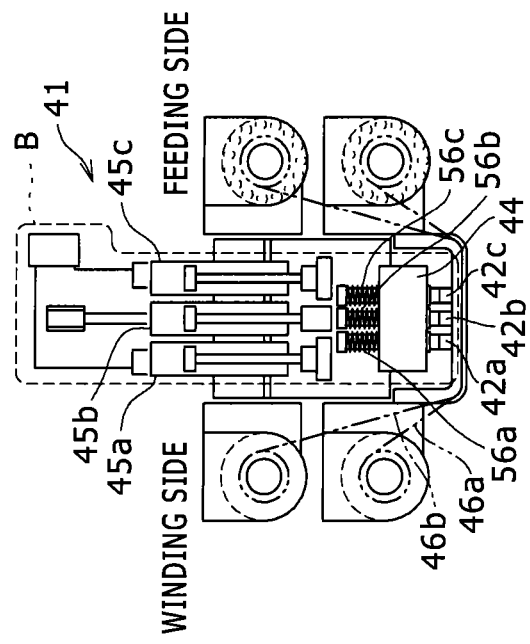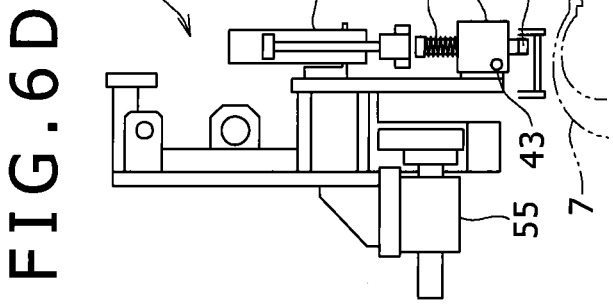

TIRE TESTING MACHINE

BACKGROUND OF THE INVENTION

1. Field of the Invention

The present invention relates to a tire testing machine for testing tires.

2. Description of the Related Art

When tires mounted on vehicles or the like are nonuniform in elasticity, size, or shape in the circumferential direction thereof, the above nonuniform part might cause vibration in rotation at high speed, thus decreasing traveling performance. For this reason, tires undergo performance tests by being examined for circumferential uniformity by means of a tire testing machine after vulcanizing and molding step.

The tires after undergoing various performance tests by the tire testing machine are subjected to marking by a marking device. The marking device performs marking by pushing a heated marking pin against a thermal transfer tape, and pressing the tape against the tire to print a desired mark on the tire by the thermal transfer.

For example, in a marking device disclosed in JP 2000-329658 A, two markings are applied to a tire by arranging two tapes adjacent to each other in a substantially circumferential direction (tangential direction) of the tire, and assigning different marking pins to the respective two tapes. The marking device can print in different colors by using the two different colored tapes. Further, JP 2006-95738 A discloses a marking device including two tapes arranged in parallel in a radial direction of a tire. This marking device can mark the same type of tire in the same position while switching between the tapes for use without adjusting the position of the tire in the circumferential direction.

In these tire testing machines, various performance tests are performed on tires according to the contents of the respective tests previously stored in a database. Based on the result of the tests by the tire testing machine, the marking device is designed to print a mark (perform marking) in a predetermined mark position of the tire (for example, the side surface of the tire) according to a marking setting condition previously stored in the database.

Conventionally, however, the contents of the tests performed by the tire testing machine, and the marking setting condition for the marking device are previously determined. Thus, the test cannot be performed by the tire testing machine according to the contents other than the determined content of the test, or the marking device cannot perform marking under any marking setting conditions other than the determined marking setting condition. For example, even when the contents of the test by the tire testing machine are not changed but only the marking setting condition for the marking device is intended to be changed, the entire information stored in the database needs to be rewritten, which takes a lot of time. For this reason, the user using the tire testing machine has difficulty in freely setting the marking setting condition. Thus, the tire testing machine has a problem of lacking general versatility.

Accordingly, it is an object of the present invention to provide a tire testing machine with improved general versatility that enables the user using the tire testing machine to freely set the marking setting condition for the marking device of the tire testing machine for testing the tire.

SUMMARY OF THE INVENTION

In order to solve the above problem, a tire testing machine according to the present invention includes: a testing station for performing a test on a tire; a marking device for printing a mark based on a result of the test, in a predetermined mark position of the tire after undergoing the test; a recipe storage device for previously storing therein contents of the test for performing the test on the tire by the tire testing machine as a recipe; a marking specification storage device for storing therein a marking setting condition for the marking device; an input device for inputting the marking setting condition to the marking specification storage device; a tire testing control unit for allowing the testing station to perform the test on the tire in accordance with the contents of the test stored in the recipe; and a marking control unit for allowing the marking device to perform the marking in accordance with the marking setting condition.

Thus, the marking setting condition for the marking device is not previously stored as the recipe together with the contents of the tests for performing the tests on the tire, but stored by the input device as the marking specification, independently from the recipe, so that the user using the tire testing machine can freely set the marking setting condition according to the desired specification. Therefore, the marking setting condition is not incorporated in the recipe itself previously stored in the tire testing machine. The change to the entire recipe itself is not required together with the change to the marking setting condition, which can reduce the time for rewriting the entire recipe, thereby improving the general versatility.

A tire testing machine according to the present invention includes: a testing station for performing a test on a tire; a marking device for printing a mark based on a result of the test, in a predetermined mark position of the tire after undergoing the test; a recipe storage device for previously storing therein contents of the test for performing the test on the tire by the tire testing machine and a first marking setting condition for the marking device as a recipe; a marking specification storage device for storing therein a second marking setting condition for the marking device which is not stored in the recipe; an input device for inputting the second marking setting condition to the marking specification storage device; a tire testing control unit for allowing the testing station to perform the test on the tire in accordance with the contents of the test stored in the recipe; a selection input device for selecting which of the first marking setting condition and the second marking setting condition is to be used as the marking setting condition for the marking device at the time of performing the test on the tire by the testing station; and a marking control unit for allowing the marking device to perform the marking in accordance with the marking setting condition selected by the selection input device.

In this way, regarding the marking setting conditions for the marking device, the normal contents are previously stored in the recipe as the first marking setting condition, and the contents different from the normal contents are stored in another marking specification different from the recipe as a second marking setting condition by means of the input device. Thus, even when changes are required to be made to the specification of the marking setting condition, the user using the tire testing machine can freely set the special specification of the marking setting condition other than normal specifications. Therefore, a marking setting condition to be changed does not need to be incorporated every time in the recipe itself previously stored in the tire testing machine, which can reduce the time for rewiring the entire recipe without changing the entire recipe, thereby improving the general versatility.

The tire testing machine of the present invention allows the user using the tire testing machine to perform marking on the desired marking setting condition in the marking device of the tire testing machine for testing the tire, thereby improving the general versatility.

BRIEF DESCRIPTION OF THE DRAWINGS

FIG. 1 is a front view showing a tire testing machine according to one embodiment of the present invention;

FIGS. 4A and 4B are diagrams showing a screen image of a controller in the tire testing machine in the one embodiment, in which FIG. 4A is a diagram showing a parameter input screen of a recipe, and FIG. 4B is a diagram showing a script selection screen;

FIGS. 6A to 6D are diagrams showing a marking head included in the marking device in the one embodiment shown in FIG. 1, in which FIG. 6A is a bottom view thereof, FIG. 6B is a front diagram thereof, FIG. 6C is a side view thereof, and FIG. 6D is a side view of a main part (B) shown in FIG. 6B.

DESCRIPTION OF THE PREFERRED EMBODIMENTS

In the following, preferred embodiments for carrying out a tire testing machine according to the present invention will be described based on one specific example with reference to the accompanying drawings.

The embodiments described below are illustrative only, and are not intended to limit the application of the tire testing machine according to the present invention. That is, the tire testing machine of the present invention is not limited to the following embodiments, and various modifications and changes can be made to those embodiments within the scope of the claims of the present invention.

(Structure of Tire Testing Machine)

First, the structure of a tire testing device according to one embodiment of the present invention will be described with reference to FIGS. 1 and 2.

Figure 2:
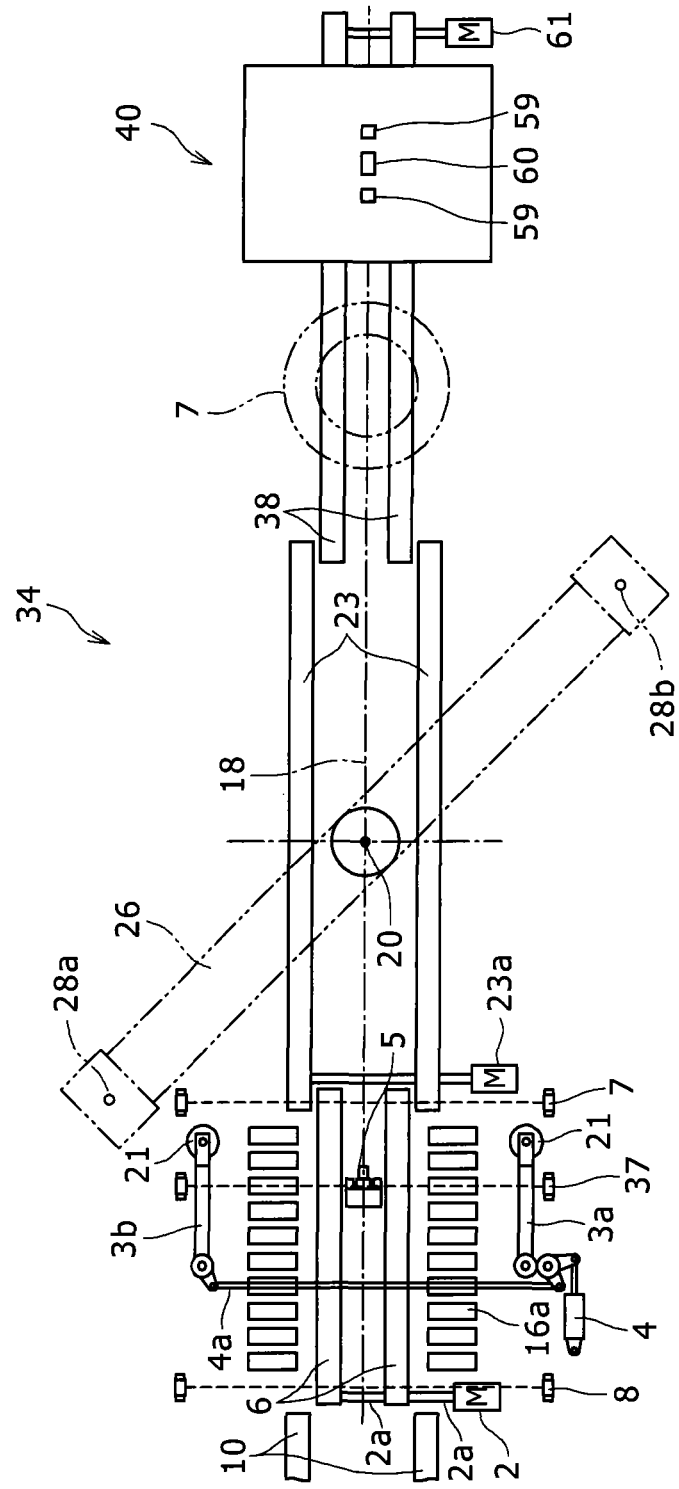
FIG. 2 is a top view showing the tire testing machine in the one embodiment.

As shown in FIGS. 1 and 2, a tire testing machine 1 includes an inlet conveyer 6 for conveying a tire 7 to be tested from a customer conveyer 10 to a center conveyer 23 and an outlet conveyer 38, a testing station 34 for testing the tire, and a marking device 40 for marking the tire 7 after undergoing tests.

The tire testing machine 1 previously stores a recipe therein. The recipe as used herein includes programs defining the contents of the tests (including the procedures of the tests or the like) to be performed by the tire testing machine 1, and marking setting conditions (including the kinds and positions of marks to be set according to the test results) for the marking device 40, or various groups of parameters. In the testing station 34, various performance tests are performed on tires according to the contents of the respective tests defined in the recipe. Based on the results of the tests, the marking device 40 prints a mark (perform marking) in a predetermined mark position of the tire (for example, the side surface of the tire) according to the marking setting condition defined in the recipe. Regarding the recipe, the contents of the tests and the marking setting condition may be stored in different controllers, or entirely stored in one controller.

(Structure of Inlet Conveyer)

The inlet conveyer 6 delivers the tire 7 in an inverting state conveyed from the customer conveyer 10 and introduced to the conveyer 6, and then conveys the tire 7 to the center conveyer 23 connected to the downstream side of the inlet conveyer 6 and extending into the test station 34. A lubricator 5 to be lifted and lowered by an air cylinder is provided between a pair of conveyance belts forming the inlet conveyer 6. Both sides of the inlet conveyer 6 in the width direction are provided a pair of arm members 3a and 3b whose tips are directed toward the downstream side with the center of the conveyer 6 in the conveyance direction serving as a fulcrum point. Each of the pair of arm members 3a and 3b is equipped with a pressing roller 21 for pressing the outer peripheral surface of the rotating tire 7 toward its center. The arm members 3a and 3b are adapted to rotate inward and outward in the width direction in a bilaterally symmetrical manner by a link mechanism 4a and an air cylinder 4. A pair of roller portions 16 with a lifting and lowering mechanism (not shown) is provided on both outer sides of the pair of conveyance belts forming the inlet conveyer 6.

When the tire 7 starts being conveyed to the inlet conveyer 6, the lifting and lowering mechanism is driven to raise a mounting surface of a roller 16a with respect to a conveyance surface of the inlet conveyer 6, thereby moving the tire 7 from the inlet conveyer 6 to the roller 16a. Then, the air cylinder 4 is driven to rotate the pair of arm members 3a and 3b inward in the width direction into a closed state. At this time, the tire 7 is being pressed from the outer and inner peripheries of the tire by the pressing rollers 21 of the pair of arm members 3a and 3b and the lubricator 5. One of the pressing rollers 21 attached to the tips of the pair of arm members 3a and 3b is driven to rotate by a motor 22, and the lubricator 5 applies a lubricant agent (lubricating liquid) to a bead located at the inner periphery of the tire 7. Then, the air cylinder 4 is driven to rotate the pair of arm members 3a and 3b outward in the width direction into an opened state, and the lifting and lowering mechanism (not shown) is driven to lower the mounting surface of the roller 16a with respect to the conveyance surface of the inlet conveyer 6, whereby the tire 7 is moved and mounted onto the conveyance surface of the inlet conveyer 6 again and then conveyed to the center conveyer 23.

The inlet conveyer 6 includes a controller C0. The controller C0 controls the above operation of the inlet conveyer 6. The controller C0 is connected to a barcode reader (not shown). The controller C0 is adapted to obtain information (size information and the like) on type of the tire 7 by reading a barcode (not shown) attached to the tire 7. The obtaining of the information on type of the tire 7 by the controller C0 may be performed not only by reading the barcode, but also by inputting with input means (not shown). Alternatively, the information on type of the tire 7 may be transferred from the customer high-order computer to the controller C0.

(Structure of Testing Station)

The testing station 34 performs various performance tests on the tire 7 conveyed from the inlet conveyer 6 to the center conveyer 23. The testing station 34 includes a lower spindle 24 and an upper spindle 25. The testing station 34 includes a chucking mechanism that is adapted to chuck the tire 7 aligned by the center conveyer 23 by sandwiching the tire between the lower spindle 24 and the upper spindle 25. The chucking mechanism includes a slide beam 26 for driving the lower spindle 24 and the upper spindle 25, guide frames 27a and 27b, ball screws 28a and 28b, and motors 29a and 29b.

The upper spindle 25 is attached to the slide beam 26. The slide beam 26 straddle between the two guide frames 27a and 27b and has its both ends attached to the ball screws 28a and 28b. One side of each of the balls screws 28a and 28b is attached to the corresponding motor 29a or 29b, and drives the ball screw 28a or 28b in synchronization therewith to thereby move the slide beam 26 upward and downward. The lower spindle 24 includes a spindle core 20. The tire 7 having its tire axis 17 aligned with the spindle core 20 is sandwiched between the lower spindle 24 and the upper spindle 25 by moving the slide beam 26 upward or downward while driving the ball screws 28a and 28b, whereby the tire 7 undergoes various performance tests in the testing station 34.

The testing station 34 includes the controller C1. The controller C1 includes a tire test controller 71 and a recipe storage device 72. The controller C1 controls the above operation of the testing station 34. The controller C1 is connected to the controller C0, and the information on the type of tire 7 is input from the controller C0. The recipe storage device 72 previously stores therein the recipe including a group of parameters in the form of table indicative of the contents of the tests (procedure of the test and the like) performed by the tire testing machine. The tire testing controller 71 controls the operation of the testing station 34 based on the recipe stored in the recipe storage device 72.

The test contents previously stored in the recipe storage device 72 as a recipe includes the following contents when performing, for example, a uniformity test. The uniformity test involves pressing a drum (not shown) against a tire, and measuring a reactive force received by the drum with a distance between both shafts of the tire and drum constant while rotating the tires at a certain speed. In this case, the test contents include specifications for measuring the reactive force received by the drum by moving the drum so as to keep a predetermined distance between both shafts of the drum and tire, and rotating a spindle in the predetermined direction, causing the tire to rotate at the predetermined certain speed. At this stage, the recipe includes, in addition to the information about the type of the tire 7 input from the controller C0, the parameters on the distance between both shafts of the drum and tire, the acceleration/deceleration of the spindle, and the like, which are input thereto by input means (not shown). The testing station 34 performs various performance tests according to the information on type of the tire 7 and the recipe with the parameters input thereinto. The results of various performance tests on the tire 7 are stored by the controller C1.

The tire 7 after undergoing various performance tests in the testing station 34 is released from the upper spindle 25 by driving the ball screws 28a and 28b to move the slide beam 26 upward or downward. Then, the center conveyer 23 is lifted to remove the tire 7 from the lower spindle 24. The tire 7 is mounted on the center conveyer 23, and then conveyed from the center conveyer 23 to the outlet conveyer 38.

(Structure of Marking Device)

The marking device 40 performs marking on the tire 7 after undergoing various performance tests in the testing station 34 and conveyed to the outlet conveyer 38. The marking device 40 includes a marking head 41 for printing a mark on the tire 7, and an air cylinder 60 for getting the marking head 41 close to the surface of the tire 7.

Figure 3:
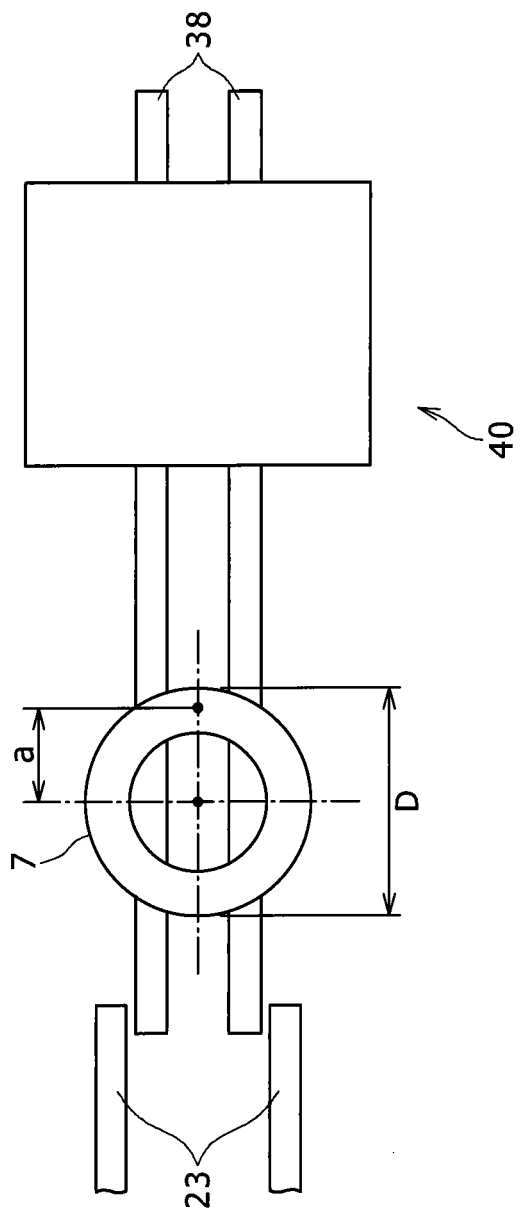
FIG. 3 is a top view showing a marking device in the tire testing machine in the one embodiment.

Above the outlet conveyer 38 for conveying the tire 7 in the inverted state, the marking head 41 supported by a lift frame 57 guided by guide portions 59 is disposed opposed to the conveyer in the vertical direction. The air cylinder 60 stands on a frame 58, and acts to lift or lower the lift frame 57, thereby vertically moving the marking head 41 upward and downward. The tire 7 on the outlet conveyer 38 is conveyed to under the marking head 41, and then stopped when a predetermined mark position of the tire 7 is aligned with a predetermined print position. The marking head 41 is moved close to the surface of the tire 7 by the air cylinder 60, whereby a mark is printed on the tire 7 on the outlet conveyer 38. As shown in FIG. 3, the alignment of the tire 7 is performed such that the print position of the tire 7 is placed in the vertical direction of the marking head 41 based on the diameter (D) of the tire 7 and the print position of the tire 7 (at a distance "a" from a central axis of the tire in the radial direction).

The air cylinder 60 is equipped with a braking mechanism so as to be capable of stopping midway of the stroke. A tire contact switch 53 is provided under the marking head 41 for sensing the contact with the tire 7. The air cylinder 60 is designed to be braked when the tire contact switch 53 contacts with the tire 7. The tire contact switch 53 includes a stick member 53a, and a limit switch (not shown). When the tip end of the stick member 53a is brought into contact with the tire 7, the limit switch on the base end side is operated. When the limit switch is operated, the air cylinder 60 is braked, thereby producing an appropriate distance between the tire 7 and the marking head 41.

Figure 5:
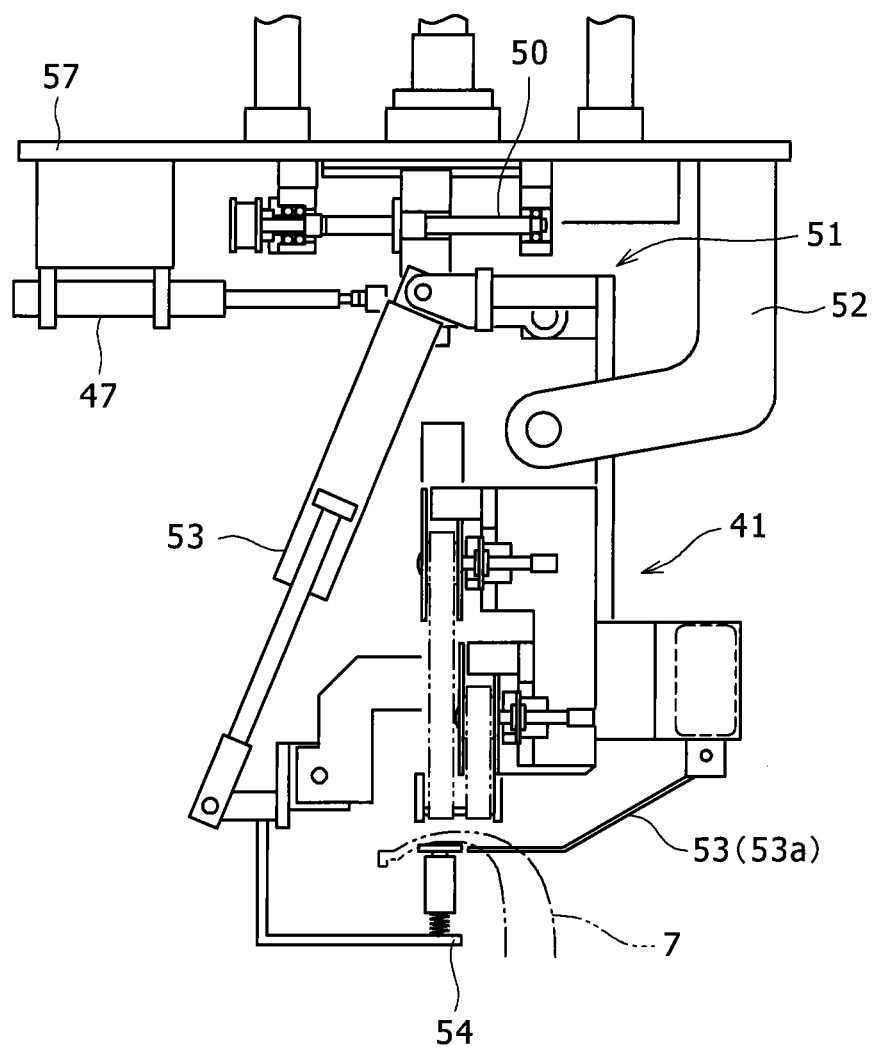
FIG. 5 is an enlarged view of a main part A showing the marking device in the tire testing machine in the one embodiment shown in FIG. 1.

As shown in FIG. 5, the marking head 41 is swingingly attached to a rotary shaft horizontally bridging between a pair of substantially L-shaped support frames 52 and 52 attached to the lift frame 57. An angle adjustment mechanism 51 for swinging the marking head 41 itself and a linear sensor 47 for measuring an angle of the marking head 41 are provided under the lift frame 57. The marking head 41 has the angle thereof adjusted by the angle adjustment mechanism 51 driven by a ball screw 50 and a motor (not shown) rotating the ball screw 50 so as to have an angle appropriate for printing with respect to the motor 7. A support 54 is rotatably attached to the marking head 41. The support 54 is adapted to push the back side of the tire 7 to prevent the tire 7 from being dented upon pressing marking pins 42a, 42b, and 42c against the tire 7. The support 54 is rotatably driven by the air cylinder 53 that is attached to the marking head 41 so as to direct the rod downward.

As shown in FIG. 6B, marking pins 42a, 42b, and 42c are mounted under the marking head 41. Each of the marking pins 42a, 42b, and 42c has its tip formed in a circular or triangle shape or the like according to the shape of a mark to be printed. As shown in FIG. 6D which is a side view of a main part B shown in FIG. 6B, the making pins 42 (42a, 42b, 42c) are inserted into a block 44 whose temperature is adjusted by a heater 43, to an appropriate temperature for thermal transfer tapes 46a and 46b. The marking pins 42a, 42b, and 42c are pushed out by the air cylinders 45a, 45b, and 45c toward heat transfer tapes 46a and 46b opposed to the pins, respectively.

As shown in FIGS. 6A and 6C, a support stand 48 supports the two heat transfer tapes 46a and 46b arranged in parallel in the direction D perpendicular to the direction C as the longitudinal direction of the marking pins 42a, 42b, and 42c. Each of the heat transfer tapes 46a and 46b is a tape with ink applied thereto, ink which is to be transferred to an object of interest by heat. In the present embodiment, the heat transfer tape 46a and the heat transfer tape 46b are different in color. The heat transfer tape 46a is disposed on the air cylinder 55 side (back side) with respect to the heat transfer tape 46b. The support stand 48 is connected to an air cylinder 55. The air cylinder 55 moves the support stand 48 in the direction D, thereby causing any one of the two heat transfer tapes 46a and 46b to be opposed to the marking pins 42a, 42b, and 42c in the direction C.

One of the air cylinders 45a, 45b, and 45c that complies with marking setting conditions to be described later is pushed out to press any one of the marking pins 42a, 42b, and 42c against the heat transfer tape 46a or 46b, whereby the printing is performed on the tire 7 aligned on the outlet conveyer 38. After the air cylinder 45a, 45b, or 45c is returned, the marking pin 42a, 42b, or 42c is returned to its original position spaced apart from the heat transfer tape 46a or 46b by a spring 56a, 56b, or 56c attached to the marking pin 42a, 42b, or 42c.

As shown in FIG. 1, the marking device 40 is provided with a controller C2. The controller C2 includes a marking controller 73, a marking specification storage device 74, an input device 75, and a selection input device 76. The controller C2 controls the above operation of the marking device 40. The controller C2 is connected to the controller C1, and the test results of the tire 7 after undergoing various performance tests are input from the controller C1. The marking specification storage device 74 previously stores therein a recipe including the description of a first marking setting condition which is the normal content of the marking device 40. The marking specification storage device 74 stores therein a script (a special marking specification different from the recipe) input by the input device 75 as needed, the script including the description of a second marking setting condition different from the normal contents of the marking device 40.

The first marking setting condition previously stored as the recipe in the controller C2, or the second marking setting condition stored as the script in the controller C2 is a marking setting condition for the type or position of the mark according to the test result of the tire 7. The specifications of the marking setting conditions are described in the following way: For example, when a rank of a variation force in the radial direction of the tire 7 (radial force variation, which is hereinafter referred to as an "RFV") as the test result is equal to or more than a predetermined rank, a red circular mark is marked on the upper surface (UPPER) of the tire in a predetermined position defined as a "RFV1H". In contrast, when a rank of the RFV as the test result is less than the predetermined rank, a blue circular mark is marked on the upper surface (UPPER) of the tire in the position RFV1H. The recipe may include as parameters, the position of the mark, the type of the mark (circular, triangular, rectangular, or the like), the color of the mark (red, blue, or the like), and the like input from among options previously stored.

The controller C2 has a function of causing the selection input device 76 to select which contents stored in the recipe or the script are referred to as the marking setting condition for the marking device 40 and to allow the selected contents to be input to the controller. The marking controller 73 performs control to cause the marking device 40 to mark the tire 7 based on the test result of the tire 7 according to either the recipe or script with the selected parameters input thereinto.

The input device 75 and the selection input device 76 include a screen display unit and an operation unit. Specifically, respective screen images of the screen display unit of the input device 75 and the selection input device 76 will be described using FIG. 4. The following input and selection operations will be performed using the operation unit while the screen is being looked at. By selecting either "Input Parameter" or "Script" in the lower portion, the recipe screen shown in FIG. 4A can input which of the recipe and the script is selected as the marking setting condition. Referring to FIG. 4A, the parameters regarding the recipe include a "marking position", a "shape of mark", and a "color of mark", which can be input. After inputting the parameter corresponding to the recipe, the "Input Parameter" is selected to refer to the contents stored in the recipe. In contrast, by selecting the "Script", a script selection screen shown in FIG. 4B is displayed, and can input which of three script files, namely, Sc1.mrk, Sc2.mrk, and Sc3.mrk can be selected. Then, the contents stored in the selected script file (script) are referred to. In the script file, the marking setting conditions are described by a Lua scripting language using the parameters, such as the number of steps of tests (various performance tests) to be performed in the testing station 34, the measurement results of numerical values obtained from the respective tests, the rank according to each measurement result of the test, the total rank of the tire tested, a waveform order of a numerical value of the measurement result of the test, an inner pressure state of the tire, a load state thereof, a diameter of the tire, a width of the tire and the like. Specifically, the special marking specifications are described in the script file in the following way: For example, when a rank of the "RFV" in rotation of the tire 7 clockwise (CW) as viewed from the upper portion of the rotation shaft is one of C, D, and E among A to E, and when a rank of a fluctuation force in the width direction of the tire 7 (lateral force variation, or "LFV") in rotation of the tire 7 counterclockwise (CCW) as viewed from the upper portion of the rotation shaft is one of D and E among A to E, a white cross mark is marked on the UPPER in the predetermined position defined as a "RFV1HP".

In this way, in the tire testing machine 1 of the present embodiment, regarding the marking setting conditions for the marking device 40, the normal contents are previously stored in the recipe as the first marking setting condition, and the contents different from the normal contents are stored in another making specification different from the recipe by the input device as the second marking setting condition. Thus, when changes are required to be made to the specification of the marking setting condition, the user using the tire testing machine 1 can freely set the special specification of the marking setting condition other than the normal specification at any time. Therefore, a marking setting condition intended to be changed does not need to be incorporated every time in the recipe itself previously stored in the tire testing machine 1, which can reduce the time for rewriting the entire recipe without changing the entire recipe, thereby improving the general versatility.

The script stored in the controller C2 is described by the general lua scripting language, and thus has improved the general versatility and reliability.

Although the preferred embodiments of the present invention have been described above, the present invention is not limited to the embodiments, and various modifications and changes can be made to the embodiments within the scope of the claims of the present invention.

The tire testing machine 1 according to the above embodiments includes the controller C1 and the controller C2, but is not limited thereto. Alternatively, the controller C1 may also have the function of the controller C2, whereby the control unit of the tire testing machine 1 may be composed of only the controller C1. In this case, the controller C1 controls the above operation of the marking device 40.

In the controller C2, the marking setting conditions for the marking device 40 may not be previously stored as the recipe, but input and stored by the input device 75 as the script. In such a case, the marking device 40 performs marking according to the contents described in the script stored in the marking specification storage device 74, as the information on type of the tire 7 and the marking setting condition for the marking device 40.

Thus, the marking setting condition for the marking device 40 is not previously stored as the recipe together with the contents of the tests for performing the tests on the tire, but stored by the input device 75 as the marking specification, independently from the recipe, so that the user using the tire testing machine 1 can freely set the marking setting conditions according to the desired specification. Therefore, the marking setting condition is not incorporated in the recipe itself previously stored in the tire testing machine 1. The change to the entire recipe itself is not required together with the change to the marking setting condition, which can reduce the time for rewriting the entire recipe, thereby improving the general versatility.

What is claimed is:

1. A tire testing machine, comprising:
- a testing station for performing a test on a tire;
- a marking device for printing a mark based on a result of the test performed by the testing station, in a predetermined mark position of the tire after undergoing the test;
- a recipe storage device for previously storing therein contents of the test to be performed on the tire by the tire testing machine and a first marking setting condition for the marking device as a recipe;
- a marking specification storage device for storing therein a second marking setting condition for the marking device, which second marking setting condition is not stored in the recipe;
- an input device for inputting the second marking setting condition to the marking specification storage device;
- a tire testing control unit for allowing the testing station to perform the test on the tire in accordance with the contents of the test stored in the recipe;
- a selection input device for selecting which of the first marking setting condition and the second marking setting condition is to be used as the marking setting condition for the marking device at the time of performing the test on the tire by the testing station; and
- a marking control unit for allowing the marking device to perform the marking in accordance with the marking setting condition selected by the selection input device.

* * * * *